United States Patent
Arai

(10) Patent No.: US 8,519,977 B2
(45) Date of Patent: Aug. 27, 2013

(54) ELECTRONIC APPARATUS, INPUT CONTROL PROGRAM, AND INPUT CONTROL METHOD

(75) Inventor: Takahiro Arai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 13/112,937

(22) Filed: May 20, 2011

(65) Prior Publication Data

US 2011/0285632 A1 Nov. 24, 2011

(30) Foreign Application Priority Data

May 21, 2010 (JP) ................................. 2010-117598

(51) Int. Cl.
*G06F 3/045* (2006.01)

(52) U.S. Cl.
USPC ............ 345/174; 345/156; 345/168; 345/619

(58) Field of Classification Search
USPC ................. 345/156, 168, 169, 173, 174, 179, 345/619; 455/566; 341/24; 358/402; 219/486
See application file for complete search history.

(56) References Cited

U.S. PATENT DOCUMENTS

| | | | | |
|---|---|---|---|---|
| 4,902,878 A * | 2/1990 | Smith et al. | ..................... | 219/486 |
| 5,956,021 A * | 9/1999 | Kubota et al. | ................. | 345/179 |
| 7,027,192 B2 * | 4/2006 | Kawai | ........................... | 358/402 |
| 7,218,250 B2 * | 5/2007 | Laliberte et al. | ................ | 341/24 |
| 7,528,824 B2 * | 5/2009 | Kong | ........................... | 345/168 |
| 7,859,515 B2 * | 12/2010 | Moon | ........................... | 345/156 |
| 8,350,815 B2 * | 1/2013 | Caliksan et al. | .............. | 345/173 |
| 2006/0026521 A1 | 2/2006 | Hotelling et al. | | |
| 2006/0026535 A1 | 2/2006 | Hotelling et al. | | |
| 2006/0066576 A1 * | 3/2006 | Kong | .............................. | 345/168 |
| 2006/0209014 A1 * | 9/2006 | Duncan et al. | ................ | 345/156 |
| 2007/0152978 A1 | 7/2007 | Kocienda et al. | | |
| 2008/0316178 A1 * | 12/2008 | Caliksan et al. | .............. | 345/169 |
| 2009/0176532 A1 * | 7/2009 | Chae et al. | ..................... | 455/566 |
| 2010/0002013 A1 * | 1/2010 | Kagaya | ......................... | 345/619 |

FOREIGN PATENT DOCUMENTS

| | | |
|---|---|---|
| JP | 58-155029 | 9/1983 |
| JP | 2008-508600 | 3/2008 |
| JP | 2008-123114 | 5/2008 |

(Continued)

OTHER PUBLICATIONS

Lei et al., "Multiple-touch technology", Computer.org/ IT Pro, Jan./Feb. 2009, pp. 42-49.*

(Continued)

*Primary Examiner* — Thuy Pardo
(74) *Attorney, Agent, or Firm* — Knobbe, Martens, Olson & Bear LLP

(57) ABSTRACT

According to one embodiment, an electronic apparatus includes a touch panel, a display, a key detection module, a keyboard display module and a transmission module. The key detection module is configured to detect a touch and a release of a key of a software keyboard, based on touch detection on the touch panel. The transmission module is configured to transmit data indicative of key-down of a first key in accordance with touch detection of the first key, to transmit data indicative of key-down of a second key in accordance with touch detection of the second key in a state in which the first key is touched, and then to transmit data indicative of key-up of the first key and the second key in accordance with release detection of the first key and the second key.

18 Claims, 13 Drawing Sheets

(56) References Cited

FOREIGN PATENT DOCUMENTS

| | | |
|---|---|---|
| JP | 2008-533581 | 8/2008 |
| JP | 2009-522697 | 6/2009 |
| WO | WO 2006-020304 | 7/2005 |
| WO | WO 2006-095320 | 9/2006 |
| WO | WO 2007-082139 | 7/2007 |

OTHER PUBLICATIONS

Japanese Office Action dated Aug. 2, 2011 for Japanese Application No. 2010-117598 filed May 21, 2010.

* cited by examiner

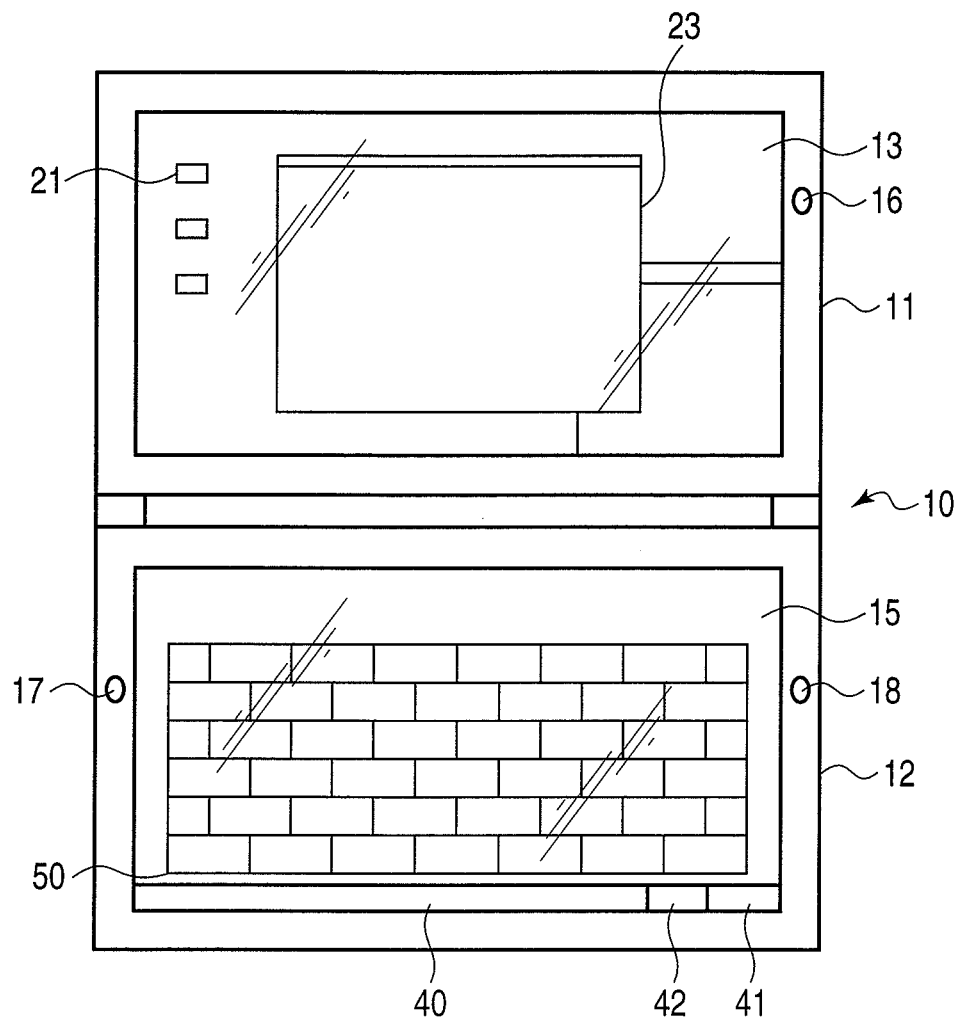
F I G. 2

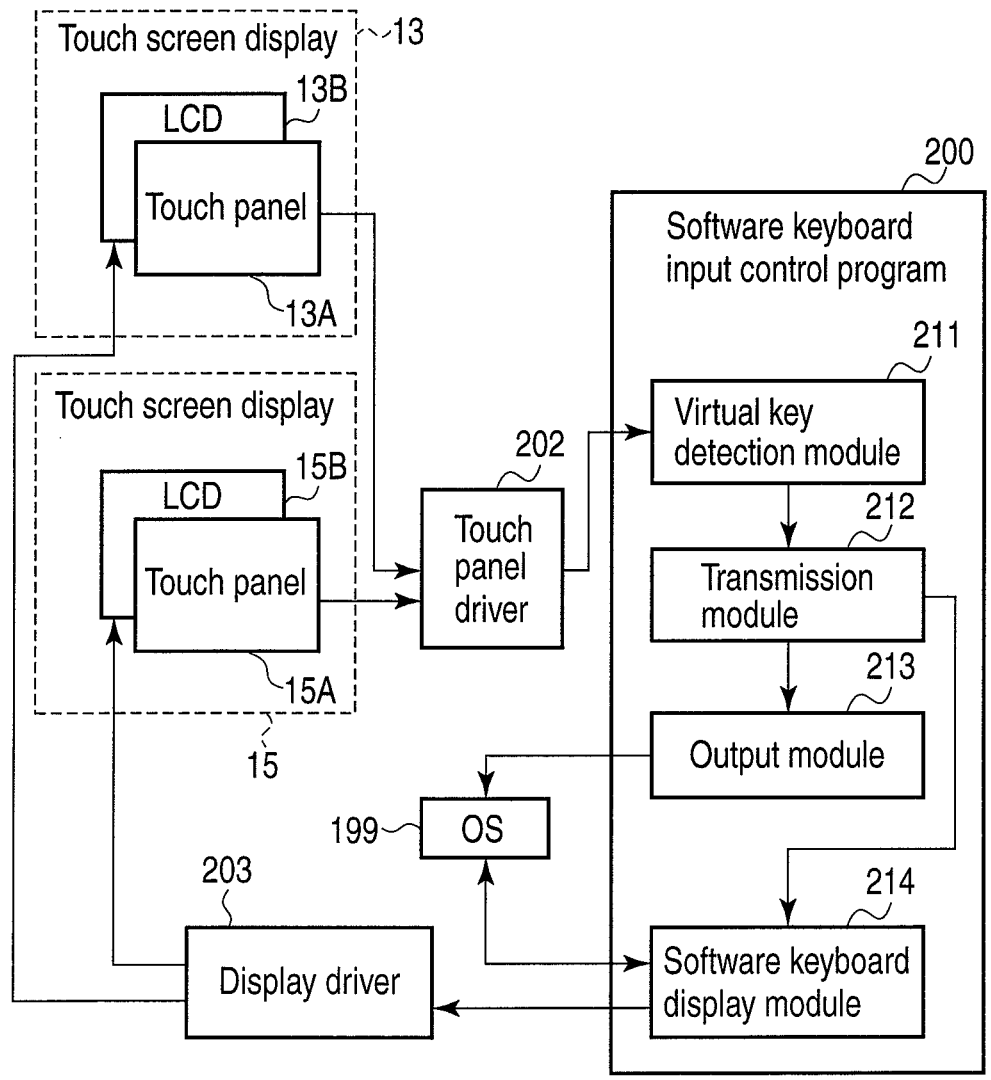
F I G. 4

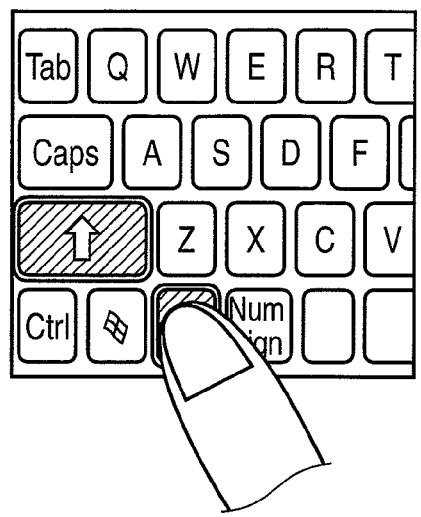
F I G. 1 2
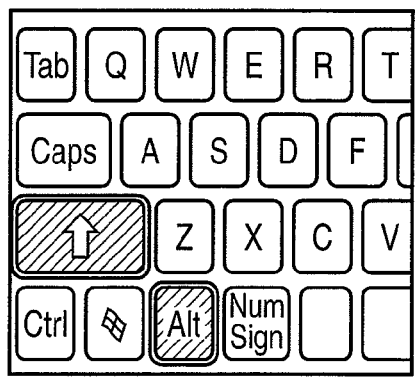
F I G. 1 3
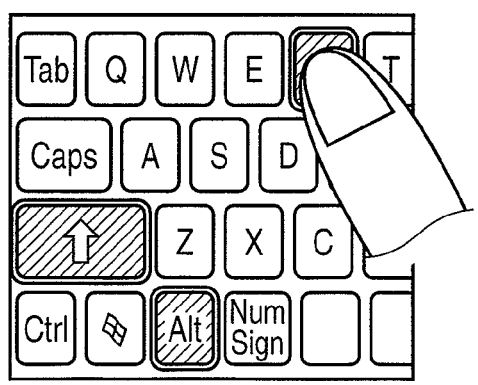
F I G. 1 4

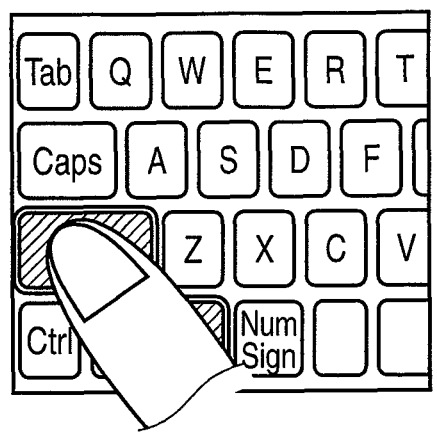
F I G. 1 9
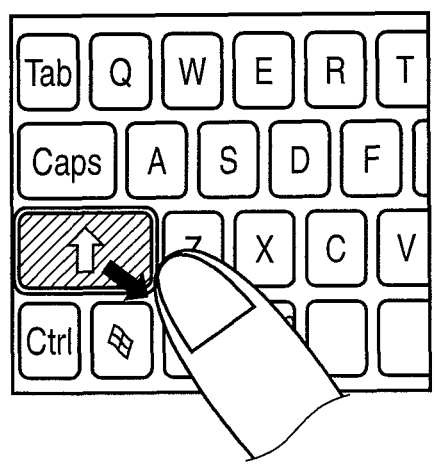
F I G. 2 0

ELECTRONIC APPARATUS, INPUT CONTROL PROGRAM, AND INPUT CONTROL METHOD

CROSS-REFERENCE TO RELATED APPLICATIONS

This application is based upon and claims the benefit of priority from Japanese Patent Application No. 2010-117598, filed May 21, 2010; the entire contents of which are incorporated herein by reference.

FIELD

Embodiments described herein relate generally to an electronic apparatus including a touch panel, an input control program and an input control method.

BACKGROUND

There is known an electronic apparatus such as a personal computer, which includes a touch panel as an input device. Also known is an electronic apparatus including a touch screen display in which a display is integrated with a touch panel. As regards the electronic apparatus with the touch screen display, a system has been developed which displays a virtual keyboard (software keyboard) on which a plurality of keys are arranged, and inputs data corresponding to a touch operation on the software keyboard.

In the conventional electronic apparatus with the software keyboard, it is assumed that a single touch (click) is performed on the touch screen display. Thus, in the case of inputting by using both a modifier key (e.g. Shift key), which can instruct a specific function in combination with some other key, and this other key (i.e. an input by "combination key"), the modifier key is first touched and then the modifier key is locked in a pressed state ("key lock"), and in this state the other key is touched.

In recent years, an electronic apparatus including a multi-point touch screen, which can detect a plurality of touch positions, has been used. In this electronic apparatus, for example, a touch on a first key, which is a modifier key, and a touch on a second key, such as a symbol key, are detected at the same time, and a signal corresponding to the detected keys is generated.

In this manner, in the electronic apparatus including the touch screen display which can perform multi-touch, touches on plural keys can detected at the same time.

However, in some cases, it is easier to perform an operation by successively touching a modifier key and another key, than to perform an operation by simultaneously touching a plurality of keys. For example, there is such a case that the electronic apparatus is held by one hand and a touch operation is performed by the other hand, or the electronic apparatus is held by one hand and a touch operation is performed by the thumb alone. In such a case, the operability is higher if the touch on the modifier key is locked in a pressed state ("key lock") and in this state some other key is touched.

As described above, in the case of performing a modifier-key-combined input by a combination of a modifier key and some other key, there has been a demand for realization of easy selective use of either the simultaneous touch on the modifier key and the other key, or the key lock by the touch on the modifier key.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary view showing an example of a screen on which a software (SW) keyboard is displayed in the embodiment;

FIG. 4 is an exemplary block diagram showing the functional structure of a software keyboard (SWKB) input control program in the embodiment;

FIG. 12 is an exemplary view showing an example of the state of the SW keyboard in the embodiment;

FIG. 13 is an exemplary view showing an example of the state of the SW keyboard in the embodiment;

FIG. 14 is an exemplary view showing an example of the state of the SW keyboard in the embodiment;

FIG. 19 is an exemplary view showing an example of the state of the SW keyboard in the embodiment; and FIG. 20 is an exemplary view showing an example of the state of the SW keyboard in the embodiment.

DETAILED DESCRIPTION

Various embodiments will be described hereinafter with reference to the accompanying drawings.

In general, according to one embodiment, an electronic apparatus comprises a touch panel, a display, a keyboard display module, a key detection module, and a transmission module. The keyboard display module is configured to display on the display a software keyboard comprising a plurality of keys. The key detection module is configured to detect a touch and a release of a key of the software keyboard, based on touch detection on the touch panel. The transmission module is configured to transmit, as a detection result of a first operation, data indicative of key-down of a first key in accordance with touch detection of the first key, to transmit data indicative of key-down of a second key in accordance with touch detection of the second key in a state in which the first key is touched, and then to transmit data indicative of key-up of the first key and the second key in accordance with release detection of the first key and the second key, and configured to transmit, as a detection result of a second operation, data indicative of key-down of the first key in accordance with touch detection of the first key, to transmit data indicative of key-down of the second key in accordance with touch detection of the second key after detection of a specific operation on the first key, and then to transmit data indicative of key-up of the second key in accordance with release detection of the second key and thereafter transmit data indicative of key-up of the first key.

Figure 1:
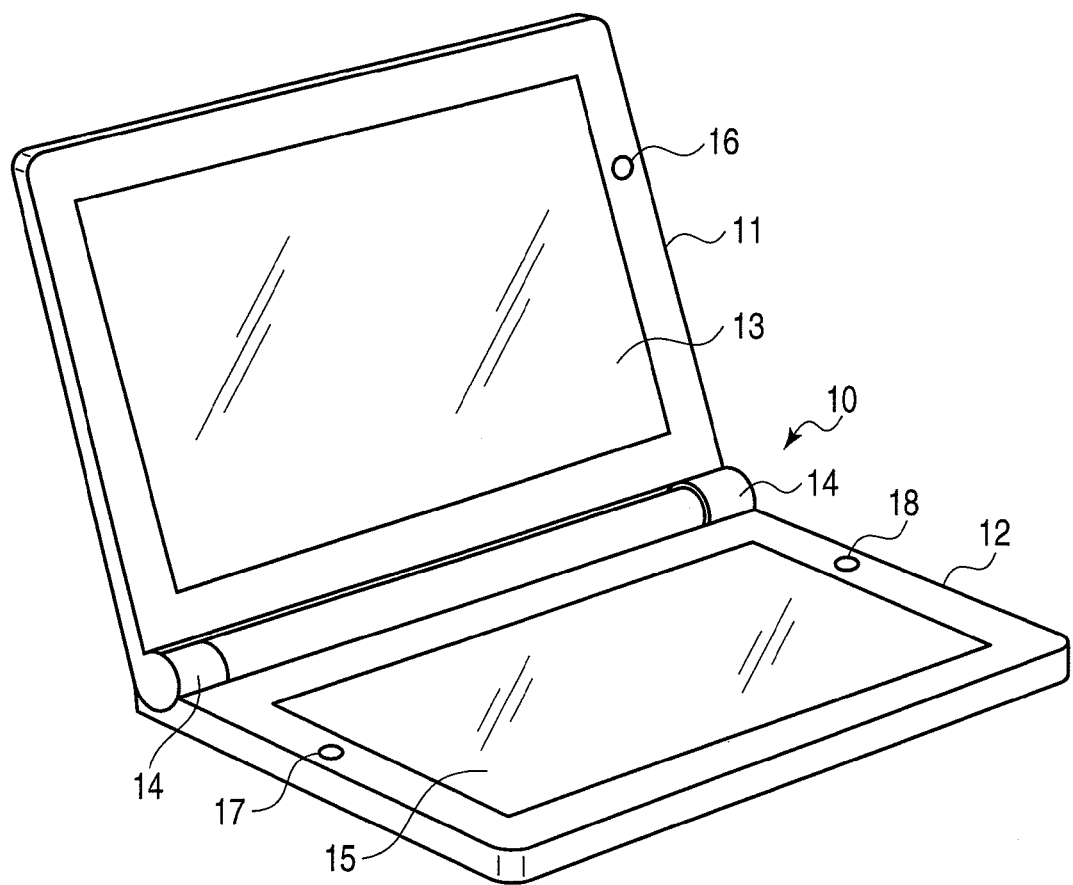
FIG. 1 is an exemplary view showing the external appearance of an information processing apparatus according to an embodiment.

FIG. 1 is an exemplary view showing the external appearance of an information processing apparatus according to the embodiment. This information processing apparatus is realized, for example, as a battery-powerable portable personal computer 10.

FIG. 1 is a perspective view showing the personal computer 10 in a state in which a first unit 11 of the personal computer 10 is opened. The personal computer 10 comprises the first unit 11 and a second unit 12. A touch screen display 13 is built in an upper surface of the first unit 11. The touch screen display 13 is composed of a touch panel 13A and a liquid crystal display (LCD) 13B, and a display screen of the touch screen display 13 is disposed at a substantially central part of the first unit 11.

The touch screen display 13 is configured, for example, such that the touch panel 13A is attached to the surface of the LCD 13B, and the touch screen display 13 can realize display by the LCD 13B and the detection of a touch position which is touched by a pen or a finger. The user can select various objects, which are displayed on the LCD 13B, by using a pen or a fingertip. The objects, which are to be touched by the user, include, for instance, a software keyboard (to be described later), a software touch pad, icons representing folders and files, menus and buttons. The coordinate data representing the touch position on the display screen is input from the touch panel 13A to the CPU in the computer 10.

The first unit 11 has a thin box-shaped housing. The first unit 11 is rotatably attached to the second unit 12 via a hinge module 14. The hinge module 14 is a coupling module for coupling the first unit 11 to the second unit 12. Specifically, a lower end portion of the first unit 11 is supported on a rear end portion of the second unit 12 by the hinge module 14. The first unit 11 is attached to the second unit 12 such that the first unit 11 is rotatable, relative to the second unit 12, between an open position where the top surface of the second unit 12 is exposed and a closed position where the top surface of the second unit 12 is covered by the first unit 11. A power button 16 for powering on or off the personal computer 10 is provided at a predetermined position of the first unit 11, for example, on the right side of the touch screen display 13.

The second unit 12 is a base unit having a thin box-shaped housing. A touch screen display 15 is built in an upper surface of the second unit 12. The touch screen display 15 is composed of a touch panel 15A and a liquid crystal display (LCD) 15B, and a display screen of the touch screen display 15 is disposed at a substantially central part of the second unit 12.

Two button switches 17 and 18 are provided at predetermined positions on the upper surface of the second unit 12, for example, on both sides of the touch screen display 15. Arbitrary functions can be assigned to the button switches 17 and 18. For example, the button switch 17 is used as a button switch for inputting an instruction to start a software keyboard input control program (to be described later). For example, when the button switch 17 is pressed by the user, the software keyboard input control program is started.

The touch screen display 15 is configured, for example, such that the touch panel 15A is attached to the surface of the LCD 15B, and the touch screen display 15 can realize display by the LCD 15B and the detection of a touch position which is touched by a pen or a finger. The user can select various objects, which are displayed on the LCD 15B, by using a pen or a fingertip. The objects, which are to be touched by the user, include, for instance, a software keyboard (to be described later), a software touch pad, icons representing folders and files, menus, buttons, and an application window. The coordinate data representing the touch position on the display screen is input from the touch panel 15A to the CPU in the computer 10.

The LCD 15B on the second unit 12 is a display which is independent from the LCD 13B of the first unit 11. The LCDs 13 and 15 can be used as a multi-display for realizing a virtual screen environment. In this case, the virtual screen, which is managed by the operating system (OS) of the computer 10, includes a first screen region, which is displayed on the LCD 13B, and a second screen region, which is displayed on the LCD 15B. The first screen region and the second screen region can display arbitrary application windows, arbitrary objects, etc., respectively. In addition, the OS can manage the first screen region and second screen region as a single region, and can display an object, which is a display target, at an arbitrary position.

In the personal computer 10 of the embodiment, an input operation application for inputting data by a touch operation on the touch screen display 13, 15 by means of a pen or fingertip is provided in place of an input device such as a keyboard or a mouse/touch pad. The input operation application in the embodiment includes, for example, a software keyboard input control program 200 (hereinafter referred to as "SWKB input control program 200).

The SWKB input control program 200 displays a software keyboard (hereinafter "SW keyboard") as an operation input screen on the touch screen display 13, 15, and inputs data corresponding to the user's touch operation on an area on which the SW keyboard is displayed.

FIG. 2 shows an example of the screen of the touch screen display 15, which displays a SW keyboard 50 by the execution of the SWKB input control program 200 in the embodiment. The SW keyboard 50 can be displayed, for example, in a full-screen mode on the entirety of the screen of the touch screen display 15 (LCD 15B). The SW keyboard 50 includes a plurality of virtual keys for inputting a plurality of key codes (e.g. a plurality of numeral keys, a plurality of alphabet keys, a plurality of arrow keys, a plurality of auxiliary keys, and a plurality of function keys). By a touch operation on a virtual key of the SW keyboard 50, code data corresponding to the virtual key at the touch position is input. Similarly, on the touch screen display 13, the SWKB input control program 200 can display a SW touch pad.

A display position change key is provided on the SW keyboard 50. If a touch operation is executed on the display position change key, the SWKB input control program 200 changes the touch screen display on which the SW keyboard 50 is to be displayed. For example, as shown in FIG. 2, when the SW keyboard 50 is displayed on the touch screen display 15, the display position change key displays an upward arrow pointing toward the touch screen display 13. If the display position change key is touched in this state, the SWKB input control program 200 changes the display position of the SW keyboard 50 from the touch screen display 15 to the touch screen display 13. When the SW keyboard 50 is displayed on the touch screen display 13, the arrow of the display position change key is a downward arrow.

In addition, as shown in FIG. 2, a toolbar 40 is provided at a lowermost row of the display area of the touch screen display 15. The toolbar 40 is provided with a SW keyboard start button 41 for starting the SWKB input control program 200, and another button 42. By performing a touch operation on the SW keyboard start button 41, the user can start the SWKB input control program 200, in the same manner as in the case of inputting a start instruction by the button switch 17.

Figure 3:
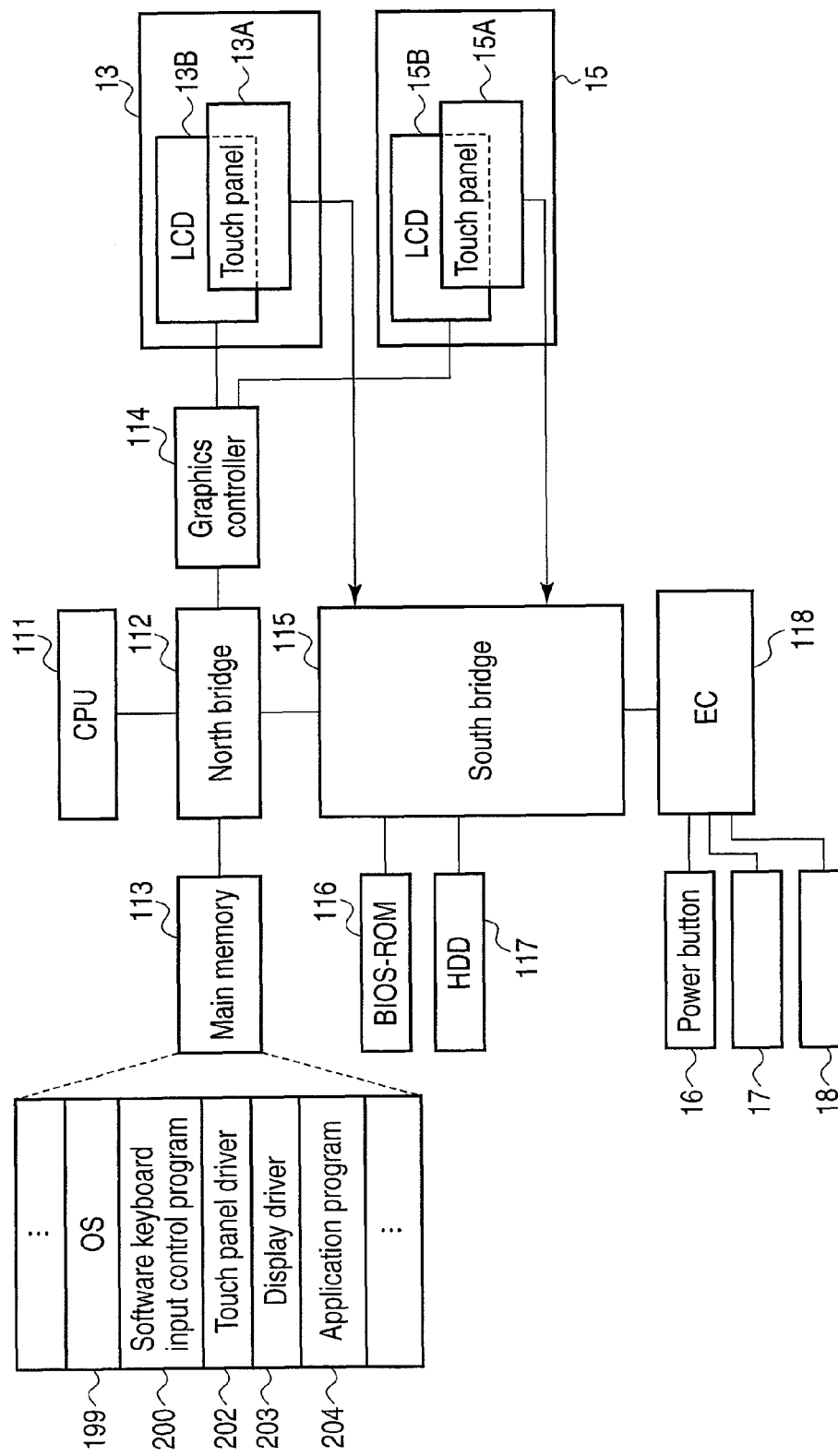
FIG. 3 is an exemplary block diagram showing an example of the system configuration of a personal computer in the embodiment.

Next, the system configuration of the personal computer 10 in the embodiment is described. FIG. 3 is a block diagram showing the system configuration of the personal computer 10.

The personal computer 10 includes a CPU 111, a north bridge 112, a main memory 113, a graphics controller 114, a south bridge 115, a BIOS-ROM 116, a hard disk drive (HDD) 117, and an embedded controller 118.

The CPU 111 is a processor which is provided in order to control the operation of the computer 10. The CPU 111 executes an operating system (OS) 199 and various application programs, which are loaded from the HDD 117 into the main memory 113. The application programs include an input operation application such as the SWKB input control program 200, and other application programs 204 such as a browser program and a word processing program. The SWKB input control program 200 displays the SW keyboard 50 on the touch screen 13, 15, and generates code data corresponding to a touch operation on the SW keyboard 50 by the user.

The CPU 111 also executes a system BIOS (Basic Input/Output System) which is stored in the BIOS-ROM 116. The system BIOS is a program for hardware control.

Besides, under the control of the OS 199, the CPU 111 executes a touch panel driver 202 which controls the driving of the touch panels 13A and 15A, and a display driver 203 which controls the display on the LCDs 13B and 15B.

The north bridge 112 is a bridge device which connects a local bus of the CPU 111 and the south bridge 115. The north bridge 112 includes a memory controller which access-controls the main memory 113. The graphics controller 114 is a display controller which controls the two LCDs 13B and 15B which are used as a display monitor of the computer 10.

The graphics controller 114 executes a display process (graphics arithmetic process) for rendering display data on a video memory (VRAM), based on a rendering request which is received from CPU 111 via the north bridge 112. A recording area for storing display data corresponding to a screen image which is displayed on the LCD 13B and a recording area for storing display data corresponding to a screen image which is displayed on the LCD 15B are allocated to the video memory. The transparent touch panel 13A is disposed on the display surface of the LCD 13B. Similarly, the transparent touch panel 15A is disposed on the display surface of the LCD 15B.

Each of the touch panels 13A and 15A is configured to detect a touch position on a touch detection surface by using, for example, a resistive method or a capacitive method. As the touch panel 13A, 15A, use may be made of a multi-touch panel which can detect two or more touch positions at the same time. The touch panel 13A, 15A outputs data, which is detected by the user's touch operation, to the south bridge 115.

The south bridge 115 incorporates an IDE (Integrated Drive Electronics) controller and a Serial ATA controller for controlling the HDD 121. The embedded controller (EC) 118 has a function of powering on/off the computer 10 in accordance with the operation of the power button switch 16 by the user. In addition, the south bridge 115 receives data from the touch panel 13A, 15A, and records the data in the main memory 113 via the north bridge 112.

Next, referring to FIG. 4, the functional structure of the SWKB input control program 200 in the embodiment is described.

The SWKB input control program 200 receives touch position information from the touch panel 13A, 15A via the touch panel driver 202, and selects, based on the touch position information, a virtual key which is touched by the user, from among the plural virtual keys in the keyboard 50. The touch position information includes coordinate data indicative of a touch area (touch position) on the touch panel display (LCD 15 and touch panel 15A), which is touched by an external member (e.g. the user's finger or pen). The SWKB input control program 200 detects a touch and a release on/from a virtual key of the SW keyboard 50, and controls a modifier-key-combined input by a combination between a modifier key and some other key.

The SWKB input control program 200 includes, as function executing modules, a virtual key detection module 211, a transmission module 212, an output module 213 and a software keyboard display module 214.

The virtual key detection module 211 detects a touch and a release on/from a virtual key of the SW keyboard 50 which is displayed by the software keyboard display module 214, based on the touch position information on the touch panel 13A, 15A, which is input via the touch panel driver 202. Based on the touch position, the virtual key detection module 211 selects any one of the plural virtual keys included in the SW keyboard 50.

The transmission module 212 controls the transmission of data indicative of a touch and a release on/from virtual keys, which are detected by the virtual key detection module 211, so that the user may easily selectively use either a modifier-key-combined input (an input by a first operation) by a simultaneous touch on a modifier key and some other key, or a modifier-key-combined input (an input by a second operation) by a key lock of a modifier key and a subsequent touch on some other key. Specifically, as a detection result of the first operation, the transmission module 212 transmits data indicative of key-down of a first key in accordance with touch detection of the first key (modifier key), transmits data indicative of key-down of a second key in accordance with touch detection of the second key (e.g. character key) in the state in which the first key is touched, and thereafter transmits data indicative of key-up of the first and second keys in accordance with release detection of the first and second keys.

In addition, as a detection result of the second operation, the transmission module 212 transmits data indicative of key-down of the first key in accordance with touch detection of the first key, transmits data indicative of key-down of the second key in accordance with touch detection of the second key after a specific operation on the first key is detected, and thereafter transmits data indicative of key-up of the second key in accordance with release detection of the second key and then transmits data indicative of key-up of the first key.

In accordance with the data indicative of the key-up/key-down which is output from the transmission module 212, the output module 213 outputs to the OS 199 the code data corresponding to virtual keys which are detected according to the touch positions.

The software keyboard display module 214 displays, through the display driver 203, the SW keyboard 50 on the LCD 13B (touch screen display 13) or the LCD 15B (touch screen display 15).

Figure 5:
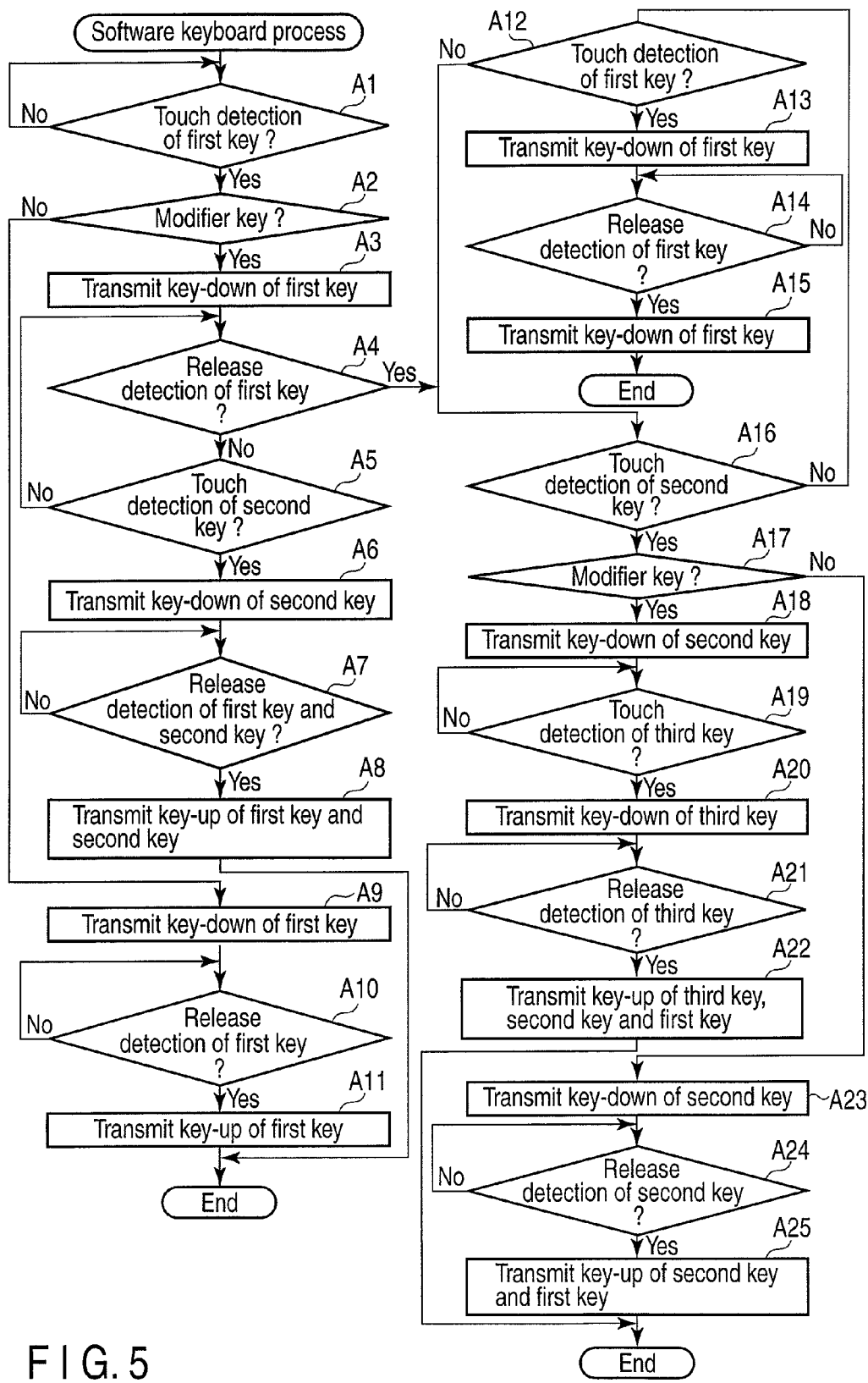
FIG. 5 is an exemplary flow chart illustrating an input control process for an input from the SW keyboard in the embodiment.

Next, referring to a flow chart of FIG. 5, a description is given of an input control process for an input from the SW keyboard 50 in the embodiment.

To start with, if the use of the SW keyboard 50 is requested by the user's operation on the button switch 17 or on the SW keyboard start button 41, the OS 199 starts the SWKB input control program 200. The SWKB input control program 200 displays, by the software keyboard display module 214, the SW keyboard 50 on the touch screen display 13 or touch screen display 15.

If the touch screen display 13, 15 (touch panel 13A, 15A) is touched by the user, the virtual key detection module 211 receives touch position information via the touch panel driver 202. If the virtual key detection module 211 detects, based on the touch position information, a touch operation on any one of the virtual keys of the SW keyboard 50, the virtual key detection module 211 notifies the transmission module 212.

The transmission module 212 determines whether the virtual key (first key), the touch on which has first been detected, is a modifier key which can instruct a specific function in combination with some other key. The modifier key is, for instance, a Shift key (Shift), a Control key (Ctrl), or an Alt key (Alt). In addition, there is a modifier key which can instruct a specific function even when it is singly selected. Besides, if an ordinary key, such as a character key or a numeral key, is defined by the SWKB input control program 200 as a key which can instruct a specific function in combination with some other key, such an ordinary key functions as a modifier key.

If the touch-detected virtual key is not a modifier key (No in block A2), the transmission module 212 transmits data indicative of key-down of this virtual key (block A9). If a release of the virtual key is detected (Yes in block A10), the transmission module 212 transmits data indicative of key-up of the virtual key (block A11).

Specifically, if the user taps a virtual key other than a modifier key (i.e. if the user touches a virtual key other than a modification key and immediately releases the virtual key), the transmission module 212 notifies the key-down/key-up of this virtual key. In this case, the output module 213 outputs code data corresponding to the tapped virtual key to the OS 199.

In the meantime, when a touch on a virtual key is detected, the software keyboard display module 214 displays a region corresponding to this virtual key in a display mode different from the display mode of the other region. Then, responding to detection of release of this virtual key, the software keyboard display module 214 restores the display mode of the virtual key to the original display mode. For example, the software keyboard display module 214 displays the touched virtual key in a color different from a normal color.

On the other hand, if the touch-detected virtual key is a modifier key (Yes in block A2), the transmission module 212 transmits data indicative of key-down of this virtual key (block A3). In addition, if a touch on some other key (second key) is detected (Yes in block A5) before a release of the first key, the key-down of which has been detected, is detected, the transmission module 212 transmits data indicative of key-down of the second key (block A6).

Specifically, if the user touches the second key in the state in which the first key is touched, the transmission module 212 transmits, as a detection result of the first operation, the data indicative of key-down of the first key and second key.

The output module 213 is notified of the key-down of the second key prior to the notification of the key-up of the first key. Thereby, the output module 213 determines that the first key and second key are touched at the same time, and outputs to the OS 199 the code data corresponding to the combination of the first key (modifier key) and the second key.

Subsequently, if the release of the first key and second key is detected (Yes in block A7), the transmission module 212 transmits data indicative of key-up of the first key and second key (block A8).

If the first key and second key are released, the software keyboard display module 214 restores the display mode of the first key and second key to the original display mode.

Figure 6:
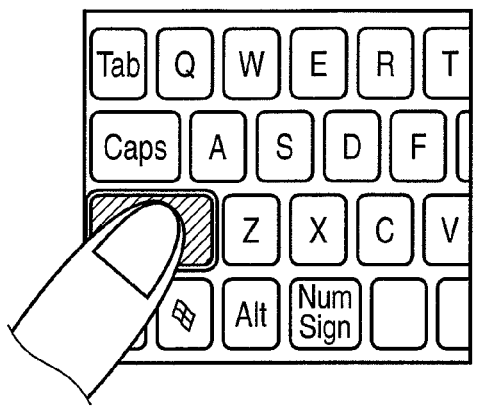
FIG. 6 is an exemplary view showing an example of the state of the SW keyboard in the embodiment.
Figure 7:
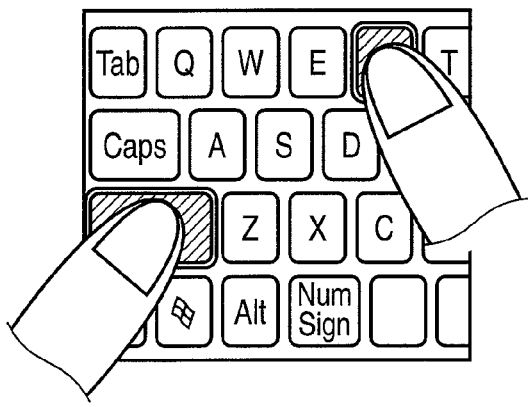
FIG. 7 is an exemplary view showing an example of the state of the SW keyboard in the embodiment.
Figure 8:
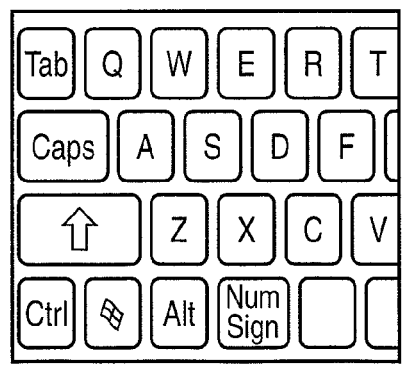
FIG. 8 is an exemplary view showing an example of the state of the SW keyboard in the embodiment.

FIG. 6, FIG. 7 and FIG. 8 show examples of the state of the SW keyboard 50 at a time when the above-described first operation is executed.

As shown in FIG. 6, after a modifier key (Shift key in FIG. 6) is touched, some other key, which is different from the modifier key, is touched, as shown in FIG. 7, in the state in which the modifier key is touched. In this case, the display mode of the two virtual keys, which are touched at the same time, is changed. Thereafter, if the modifier key and the other key, which are touched at the same time, are released, the display mode of the respective keys is restored to the original display mode, as shown in FIG. 8.

After the data indicative of the key-down of the first key is transmitted in accordance with the touch detection of the first key (modifier key), if the release of the first key is detected before a touch on the second key is detected (Yes in block A4), the transmission module 212 does not transmit the key-up of the first key. Specifically, if the first key is touched and then the first key is released, as a specific operation on the first key (modifier key), prior to a key touch (or key-down) of the second key, the key-locked state (touched state) of the first key is kept. The software keyboard display module 214 changes the display mode of the key-locked modifier key to a display mode which indicates the key-locked state of the modifier key.

Figure 9:
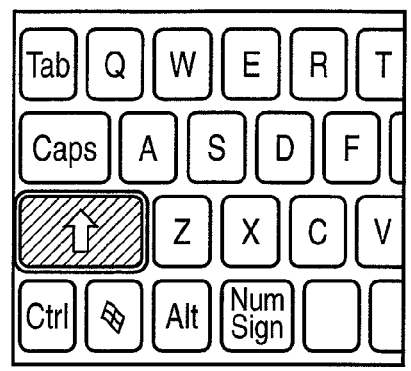
FIG. 9 is an exemplary view showing an example of the state of the SW keyboard in the embodiment.

FIG. 9 shows an example of the state in which a modifier key (Shift key in FIG. 9) is in the key-locked state.

After the modifier key (Shift key in FIG. 6) is touched, as shown FIG. 6, if the modifier key is released prior to the key touch (or key-down) of some other key, the display mode of the modifier key is changed, as shown in FIG. 9, so as to indicate the key-locked state of the modifier key.

If the touch on the second key is detected in the state in which the modifier key is in the key-locked state (Yes in block A16), the transmission module 212 transmits data indicative of the key-down of the second key (block A23) if the second key is not a modifier key (No in block A17). Then, if the release of the second key is detected (Yes in block A24), the transmission module 212 first transmits data indicative of key-up of the second key, and then transmits data indicative of key-up of the first key (block A25).

Specifically, if the user touches the second key after key-locking the modifier key, the transmission module 212 transmits, as a detection result of the second operation, data indicative of the key-down of the second key, and then notifies the key-up of the second key and first key.

The output module 213 is notified of the key-down of the second key after the notification of the key-down of the modifier key. Thereby, the output module 213 determines that an operation has been performed by the combination of the modifier key and the second key, and outputs to the OS 199 the code data corresponding to the combination of the first key (modifier key) and the second key.

If the second key is released, the software keyboard display module 214 restores the display mode of the first key and second key to the original display mode, so as to indicate the release of the key lock of the modifier key.

Figure 10:
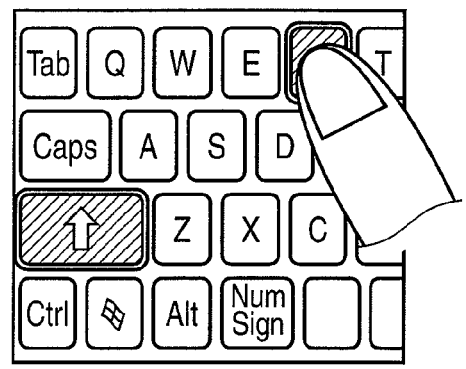
FIG. 10 is an exemplary view showing an example of the state of the SW keyboard in the embodiment.

For example, as shown in FIG. 10, if the second key (character key) is touched when the modifier key is in the key-locked state, the display mode of the first key and second key is restored to the original display mode in response to the release of the second key.

Figure 11:
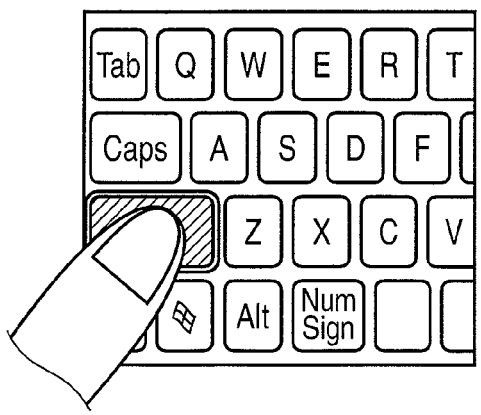
FIG. 11 is an exemplary view showing an example of the state of the SW keyboard in the embodiment.

If the modifier key (first key), which is key-locked as shown in FIG. 9, is touched once again as shown in FIG. 11 (Yes in block A12), the transmission module 212 transmits data indicative of the key-down of the first key (block A13). Then, if the first key is released (block A14), the transmission module 212 transmits the key-up of the first key (block A15). Specifically, assuming that the operation for releasing the key lock of the modifier key has been performed, the software keyboard display mode 214 restores the display mode of the modifier key to the original display mode (FIG. 8).

If the second key, which is touched in the state in which the first key (modifier key) is in the key-locked state, is a modifier key (Yes in block A17), the transmission module 212 transmits the key-down of the second key (block A18), and does not transmit key-up of the second key even if the second key is released. Specifically, like the first key, the second key is set in the key-locked state.

For example, as shown in FIG. 12, if another modifier key (second key) (Alt key in FIG. 12) is touched in the state in which the first key (Shift key) is in the key-locked state, the software keyboard display module 214 changes the display mode so as to indicate that this another modifier key is also in the key-locked state.

As shown in FIG. 14, when a touch on a key (third key) other than the modifier keys is detected (Yes in block A19), the transmission module 212 transmits data indicative of key-down of the third key (block A20). Then, if a release of the third key is detected (Yes in block A21), the transmission module 212 successively transmits data indicative of key-up of the third key, data indicative of key-up of the second key and data indicative of key-up of the first key (block A22).

The output module 213 is notified of the key-down of the third key after the notification of the key-down of the two modifier keys. Thereby, the output module 213 determines that an operation has been performed by the combination of the two modifier keys and the third key, and outputs to the OS 199 the code data corresponding to the combination of the first and second keys (modifier keys) and the third key.

In the above description, the two modifier keys are successively set in the key-locked state. However, three or more modifier keys may similarly be set in the key-locked state.

In the state in which the two modifier keys are key-locked, if the key-locked modifier keys are touched once again, the data indicative of the key-down and key-up is transmitted, as in blocks A12 to A15, and thereby the key-lock can be released.

In the above description, if a key other than the modifier key is touched in the state in which the modifier key is in the key-locked state, the key-lock of the modifier key is released. Alternatively, the key-lock of the modifier key may be maintained.

For example, in block A24, if the release of the second key is detected, only the data indicative of the key-up of the second key is transmitted in block A25, and the data indicative of the key-up of the first key is not transmitted. Thereby, a transition occurs to the same state as the state after the detection of the release of the first key (Yes in block A4), and the first key (modifier key) can be kept in the key-locked state. In this case, in order to release the key-lock, the key-locked modifier key is touched once again and is released.

In the second operation, there is a case in which a plurality of kinds of specific operations are assigned to the first key (the details will be described later; FIG. 15 to FIG. 18). In this case, according to which of the specific operations has been performed, it is possible to selectively perform an operation of releasing the key-lock of the modifier key at the same time as when the second key is released, or an operation of maintaining the key-lock of the modifier key when the second key is released.

The software keyboard display module 214 may change the display mode indicating the key-locked state, according to whether the key-lock of the modifier key is released in accordance with the release of the second key, or the key-lock of the modifier key is not released in accordance with the release of the second key. For example, the modifier key is displayed in blue (first mode) when the key-lock of the modifier key is released in accordance with the release of the second key, and the modifier key is displayed in red (second mode) when the key-lock of the modifier key is not released in accordance with the release of the second key.

As has been described above, in the personal computer 10 of the embodiment, the key-down/key-up of the key, the touch/release of which has been detected, is transmitted according to the first operation and the second operation. It is thus possible to easily selectively use the modifier-key-combined input by a simultaneous touch on a modifier key and some other key, or the modifier-key-combined input by a key lock of a modifier key and a subsequent touch on some other key. In the case of the modifier-key-combined input by the simultaneous touch, for example, when upper-case alphabet characters are to be successively input, the corresponding character keys may be successively touched while the modifier key is being touched, and therefore the operability is enhanced. In the case of the modifier-key-combined input by key-locking the modifier key, for example, the operation is easy even when the electronic apparatus is held by one hand and a touch operation is performed by the other hand, or when the electronic apparatus is held by one hand and a touch operation is performed by the thumb alone. Furthermore, in this case, the input by using three or more keys can easily be performed.

Next, a description is given of specific operations in the second operation for setting the modifier key in the key-locked state.

In the above description, in the specific operation, after the first key (modifier key) is touched, the first key is released before the second key is touched. However, other specific operations may be used. Four specific operation processes (1) to (4) will be described below.

Figure 15:
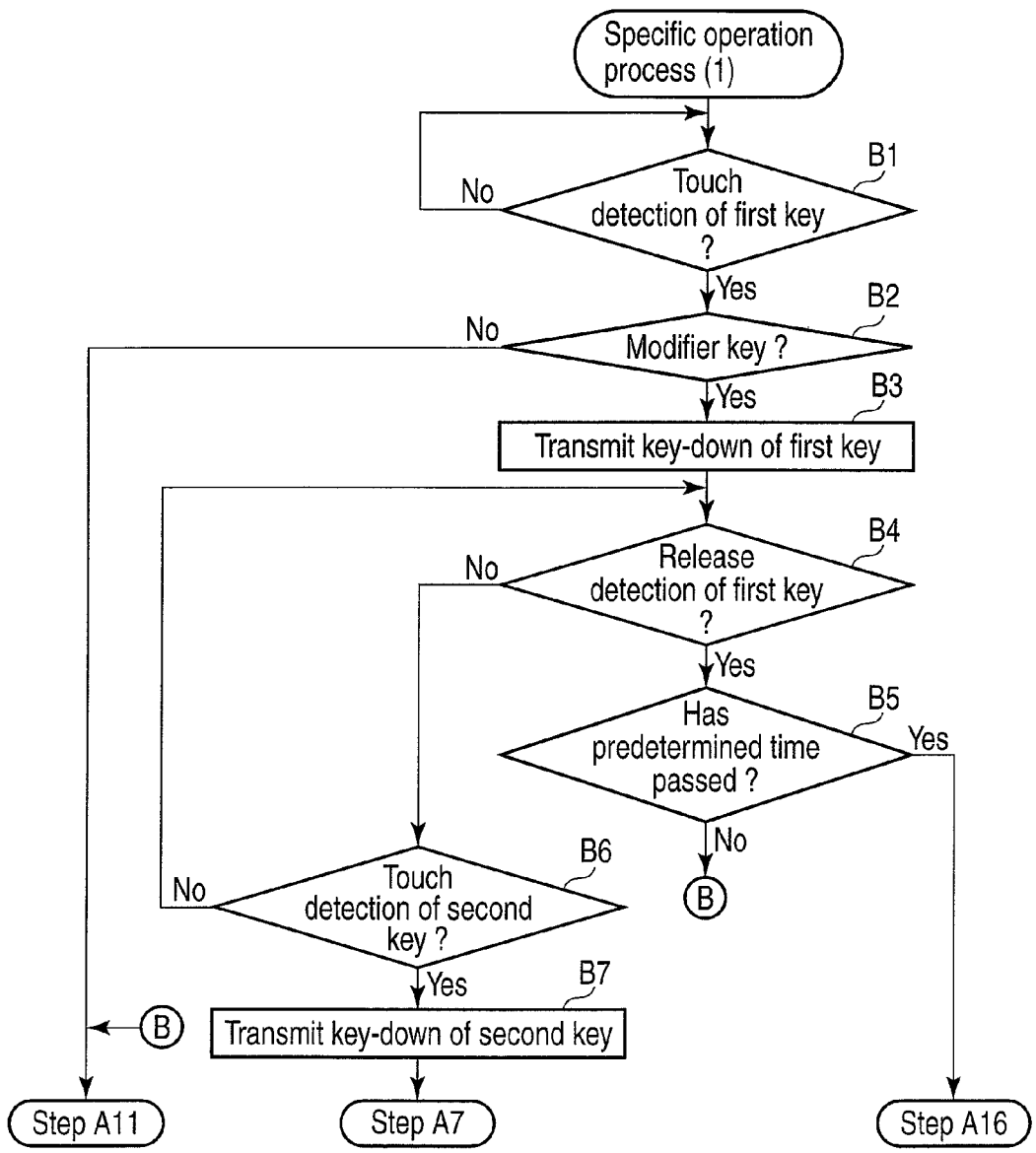
FIG. 15 is an exemplary flow chart illustrating a specific operation process (1) in the embodiment.

To begin with, the specific operation process (1) is described with reference to a flow chart of FIG. 15. In the flow chart of FIG. 15, a part of the flow chart of FIG. 5 is substituted. Blocks B1 to B3 in FIG. 15 correspond to blocks A1 to A3 in FIG. 5.

In the specific operation process (1), after the first key (modifier key) is touched, the first key is released before the second key is touched. If the time period from when the touch on the first key is detected (Yes in block B1) to when the release of the first key is detected (Yes in block B4) is a predetermined time or more (e.g. 0.3 second) (Yes in block B5), the data indicative of key-up is not transmitted in response to the detection of the release of the first key. Thereby, the first key is set in the key-locked state.

Thus, in the case of using the specific operation process (1), when the modifier key is to be key-locked, it should suffice if the modifier key is kept in touch for a predetermined time period or more, while another key is not touched (or not released).

Thereby, when a specific function can be instructed by a modifier key alone, it is possible to easily execute switching between the key-touch of the single modifier key and the key-lock of the single modifier key, according to whether or not to perform a specific operation.

Examples of the modifier key which can instruct a specific function by a single-key operation include a Function key for opening a start menu, an Alt key for opening a menu on a menu window, and a Shift key which is used to switch ON/OFF of an IME (Input Method Editor) in some languages (e.g. Chinese).

Figure 16:
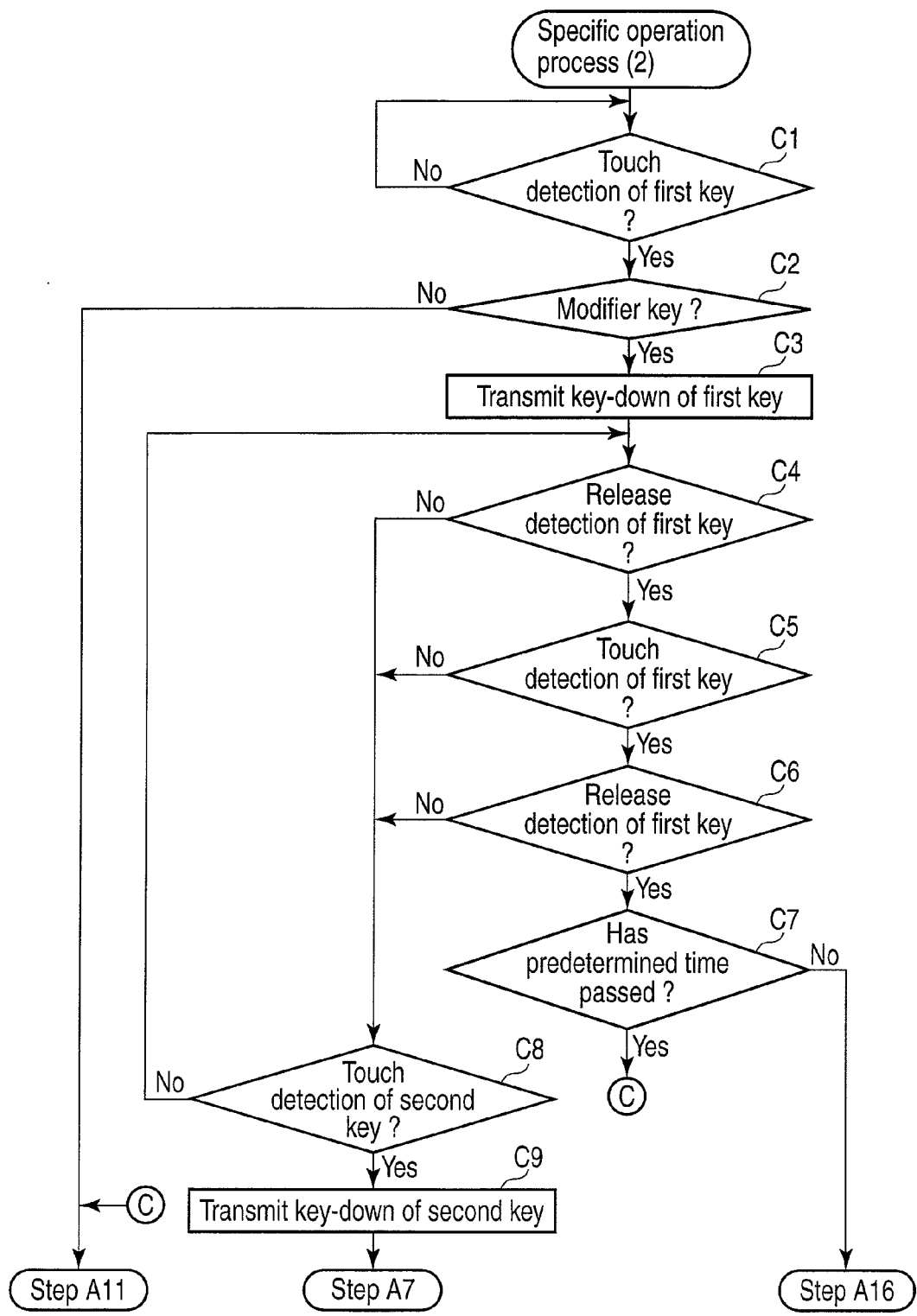
FIG. 16 is an exemplary flow chart illustrating a specific operation process (2) in the embodiment.

Next, the specific operation process (2) is described with reference to a flow chart of FIG. 16. In the flow chart of FIG. 16, a part of the flow chart of FIG. 5 is substituted. Blocks C1 to C3 in FIG. 16 correspond to blocks A1 to A3 in FIG. 5.

In the specific operation process (2), after the first key (modifier key) is touched, the first key is released before the second key is touched. If the time period from when the touch on the first key is detected (Yes in block C1) until the release of the first key is detected (Yes in block C4), a touch on the first key is detected (Yes in block C5) and a release of the first key is detected (Yes in block C6) is within a predetermined time or more (e.g. 0.5 second) (Yes in block C7), the data indicative of key-up is not transmitted in response to the detection of the release of the first key. Thereby, the first key is set in the key-locked state. Specifically, by twice tapping (double-clicking) the modifier key within the predetermined time period, the modifier key can be set in the key-locked state. Thereby, the key lock of the modifier key can positively be instructed.

Figure 17:
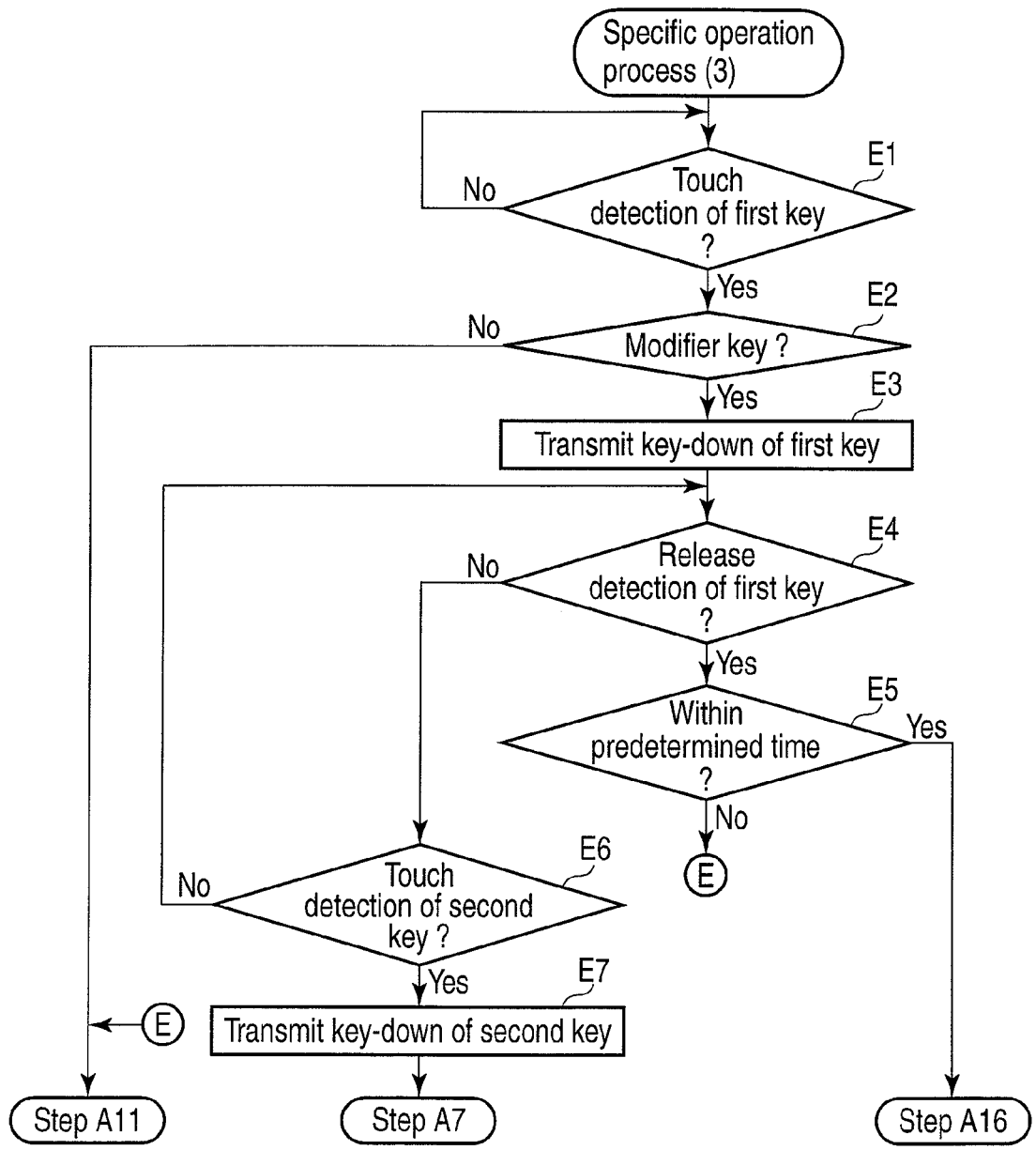
FIG. 17 is an exemplary flow chart illustrating a specific operation process (3) in the embodiment.

Next, the specific operation process (3) is described with reference to a flow chart of FIG. 17. In the flow chart of FIG. 17, a part of the flow chart of FIG. 5 is substituted. Blocks E1 to E3 in FIG. 17 correspond to blocks A1 to A3 in FIG. 5.

In the specific operation process (3), after the first key (modifier key) is touched, the first key is released before the second key is touched. If the time period from when the touch on the first key is detected (Yes in block E1) to when the release of the first key is detected (Yes in block E4) is within a predetermined time period (e.g. 0.3 second) (Yes in block E5), the data indicative of key-up is not transmitted in response to the detection of the release of the first key. Thereby, the first key is set in the key-locked state.

In the specific operation process (3), conversely to the specific operation process (1), the modifier key can be set in the key-locked state by the touch and release of the modifier key within a short time. Therefore, the usability is enhanced when the operation of switching the key lock is frequently performed.

Figure 18:
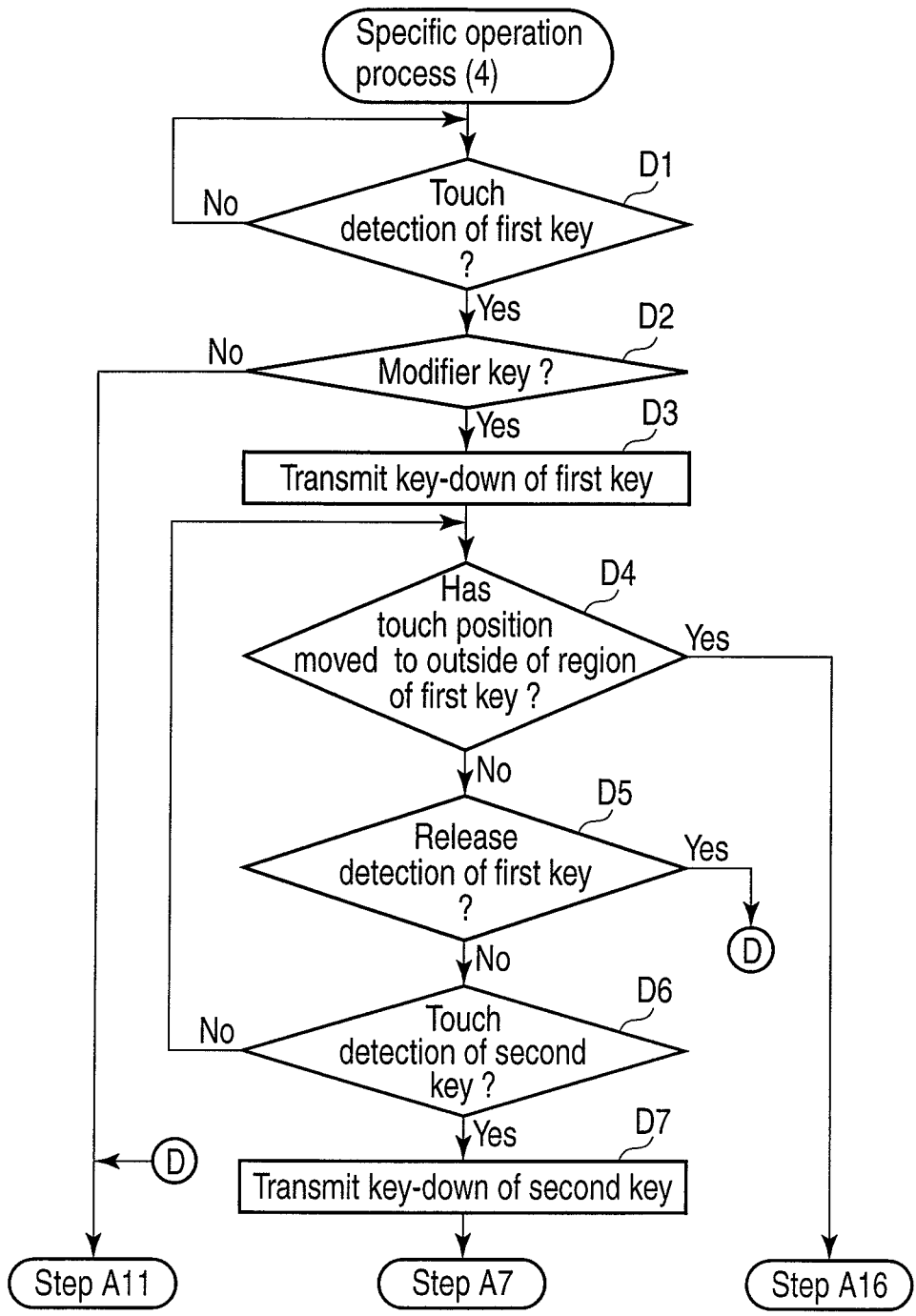
FIG. 18 is an exemplary flow chart illustrating a specific operation process (4) in the embodiment.

Next, the specific operation process (4) is described with reference to a flow chart of FIG. 18. In the flow chart of FIG. 18, a part of the flow chart of FIG. 5 is substituted. Blocks D1 to D3 in FIG. 18 correspond to blocks A1 to A3 in FIG. 5.

In the specific operation process (4), after the first key (modifier key) is touched, the first key is released before the second key is touched. After the touch on the first key is detected (Yes in block D1), if it is detected that the touch position is moved to the outside of the region of the first key (Yes in block D4), the data indicative of key-up is not transmitted in response to the detection of the release of the first key. Thereby, the first key is set in the key-locked state.

For example, after the Shift key is touched, as shown in FIG. 19, the touch position is moved to the outside of the region of the Shift key, as shown in FIG. 20. Thereby, the Shift key can be set in the key-locked state.

In the specific operation process (4), even if the user has difficulty in performing successive touch operations (double-clicking) as in the specific operation process (2), the user can surely perform the operation.

Setting as to which of the above-described specific operation processes (1) to (4) is to be used may be made in the SWKB input control program 200. In addition, by executing a utility, the user may be enabled to select, in advance, which of the specific operation processes is to be used.

It is possible to execute such setting that one modifier key can be key-locked by using, for example, two specific operation processes. According to which of the specific operation processes has been executed, it is possible to selectively perform an operation of releasing the key-lock of the modifier key or an operation of maintaining the key-lock of the modifier key, in response to the release of the second key.

A specific setting process may be determined in association with each of modifier keys. For example, such control is executed that the Shift key is key-locked when the specific operation process (1) is used, and the Ctrl key is key-locked when the specific operation process (2) is used.

In the above description, a plurality of keys, which are similar to those of an ordinary hardware keyboard, are arranged on the software keyboard 50. However, the software keyboard 50 is not limited to the keyboard form, if a plurality of objects, which can be selected by a touch operation, are included.

In the above description, the multi-touch panel, which can detect, for example, two or more touch positions at the same time, is used as the touch panel 13A, 15A. Alternatively, use may be made of a touch panel which detects a single touch position. In this case, one touch panel 13A displays a software keyboard including modifier keys, and the other touch panel 15A displays a software keyboard including keys (character keys, numeral keys, etc.) which are operated in combination with the modifier keys. Thereby, even if the touch panel 13A, 15A is a touch panel which detects a single touch position, a modifier key and some other key can be touched at the same time.

The process that has been described in connection with the above-described embodiment may be stored, as a program which can be executed by a computer, in a recording medium such as a magnetic disk (e.g. a flexible disk, a hard disk), an optical disk (e.g. a CD-ROM, a DVD) or a semiconductor memory, and may be provided to various apparatuses. The program may be transmitted via communication media and provided to various apparatuses. The computer reads the program that is stored in the recording medium or receives the program via the communication media. The operation of the apparatus is controlled by the program, thereby executing the above-described process.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a touch panel;
a display;
a keyboard display module configured to display on the display a software keyboard comprising a plurality of keys;
a key detection module configured to detect a touch and a release of a key of the software keyboard, based on touch detection on the touch panel; and
a transmission module configured to transmit, as a detection result of a first operation, data indicative of key-down of a first key in accordance with touch detection of the first key, to transmit data indicative of key-down of a second key in accordance with touch detection of the second key in a state in which the first key is touched, and then to transmit data indicative of key-up of the first key and the second key in accordance with release detection of the first key and the second key, and configured to transmit, as a detection result of a second operation, data indicative of key-down of the first key in accordance with touch detection of the first key, to transmit data indicative of key-down of the second key in accordance with touch detection of the second key after detection of a specific operation on the first key, and then to transmit data indicative of key-up of the second key in accordance with release detection of the second key and thereafter transmit data indicative of key-up of the first key.

2. The electronic apparatus of claim 1, wherein the first key is a predetermined key which is operated in combination with the second key.

3. The electronic apparatus of claim 2, wherein the transmission module is configured to transmit, as the detection result of the second operation, data indicative of key-up of the first key, when a touch and a release of the first key are detected after a release of the first key is detected following the specific operation.

4. The electronic apparatus of claim 2, wherein the transmission module is configured to transmit, as the detection result of the second operation, data indicative of key-down of a third key in accordance with touch detection of the third key after the specific operation on the second key is detected, and then to transmit, in accordance with release detection of the third key, data indicative of key-up of the third key, data indicative of key-up of the second key and data indicative of key-up of the first key.

5. The electronic apparatus of claim 2, wherein the keyboard display module is configured to display the first key in a first display mode when a first specific operation on the first key is detected, and to display the first key in a second display mode when a second specific operation on the first key, which is different from the first specific operation, is detected.

6. The electronic apparatus of claim 1, wherein the specific operation is an operation in which a time period from the touch detection of the first key to the release detection of the first key is a predetermined time period or more.

7. The electronic apparatus of claim 1, wherein the specific operation is an operation of release, touch and release of the first key within a predetermine time period.

8. The electronic apparatus of claim 1, wherein the specific operation is an operation in which a touch position is moved to an outside of a region of the first key after the first key is touched.

9. The electronic apparatus of claim 1, wherein the specific operation is an operation in which a time period from the touch detection of the first key to the release detection of the first key is within predetermined time period.

10. An electronic apparatus comprising:
a touch panel;
a display;
a keyboard display module configured to display on the display a software keyboard comprising a plurality of keys;
a key detection module configured to detect a touch and a release of a key of the software keyboard, based on touch detection on the touch panel; and
a transmission module configured to transmit, as a detection result of a first operation, data indicative of key-down of a first key in accordance with touch detection of the first key, to transmit data indicative of key-down of a second key in accordance with touch detection of the second key in a state in which the first key is touched, and then to transmit data indicative of key-up of the first key and the second key in accordance with release detection of the first key and the second key, and configured to transmit, as a detection result of a second operation, data indicative of key-down of the first key in accordance with touch detection of the first key, to transmit data indicative of key-down of the second key in accordance with touch detection of the second key after detection of a specific operation on the first key, and then to transmit data indicative of key-up of the second key in accordance with release detection of the second key.

11. The electronic apparatus of claim 10, wherein the specific operation is an operation in which a time period from the touch detection of the first key to the release detection of the first key is a predetermined time period or more.

12. The electronic apparatus of claim 10, wherein the specific operation is an operation of release, touch and release of the first key within a predetermine time period.

13. The electronic apparatus of claim 10, wherein the specific operation is an operation in which a touch position is moved to an outside of a region of the first key after the first key is touched.

14. The electronic apparatus of claim 10, wherein the specific operation is an operation in which a time period from the touch detection of the first key to the release detection of the first key is within predetermined time period.

15. An input control method comprising:
displaying on a display a software keyboard comprising a plurality of keys;
detecting a touch and a release of a key of the software keyboard, based on touch detection on a touch panel;
transmitting, as a detection result of a first operation,
data indicative of key-down of a first key in accordance with touch detection of the first key, transmitting data indicative of key-down of a second key in accordance with touch detection of the second key in a state in which the first key is touched,
and then transmitting data indicative of key-up of the first key and the second key in accordance with release detection of the first key and the second key; and
transmitting, as a detection result of a second operation, data indicative of key-down of the first key in accordance with touch detection of the first key, transmitting data indicative of key-down of the second key in accordance with touch detection of the second key after detection of a specific operation on the first key, and then transmitting data indicative of key-up of the second key in accordance with release detection of the second key and thereafter transmitting data indicative of key-up of the first key.

16. The input control method of claim 15, wherein the method comprises transmitting, as the detection result of the second operation, data indicative of key-down of a third key in accordance with touch detection of the third key after the specific operation on the second key is detected,
and then transmitting, in accordance with release detection of the third key, data indicative of key-up of the third key, data indicative of key-up of the second key and data indicative of key-up of the first key.

17. A non-transitory computer readable medium having stored thereon a computer program which is executable by a computer, the computer program controlling the computer to execute functions of:
displaying on a display a software keyboard comprising a plurality of keys;
detecting a touch and a release of a key of the software keyboard, based on touch detection on a touch panel; and
transmitting, as a detection result of a first operation, data indicative of key-down of a first key in accordance with touch detection of the first key, transmitting data indicative of key-down of a second key in accordance with touch detection of the second key in a state in which the first key is touched, and then transmitting data indicative of key-up of the first key and the second key in accordance with release detection of the first key and the second key; and
transmitting, as a detection result of a second operation, data indicative of key-down of the first key in accordance with touch detection of the first key, transmitting data indicative of key-down of the second key in accordance with touch detection of the second key after detection of a specific operation on the first key, and then transmitting data indicative of key-up of the second key in accordance with release detection of the second key and thereafter transmitting data indicative of key-up of the first key.

18. The non-transitory computer readable medium of claim 17, wherein the input control computer program controls the computer to execute a function of:
transmitting, as the detection result of the second operation, data indicative of key-down of a third key in accordance with touch detection of the third key after the specific operation on the second key is detected, and then transmitting, in accordance with release detection of the third key, data indicative of key-up of the third key, data indicative of key-up of the second key and data indicative of key-up of the first key.

* * * * *